US006269150B1

(12) United States Patent
Herrbach et al.

(10) Patent No.: US 6,269,150 B1
(45) Date of Patent: Jul. 31, 2001

(54) RELIABLE, UNATTENDED, AUTOMATED TESTING SYSTEM AND METHOD FOR COMPLEX TELECOMMUNICATION SYSTEMS

(75) Inventors: Lee Arlan Herrbach, Naperville; Victoria Blake Klick, Batavia; Jeffrey Leigh Sands, Aurora, all of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/096,067

(22) Filed: Jun. 11, 1998

(51) Int. Cl.[7] ...................................................... H04M 1/24
(52) U.S. Cl. ..................................... 379/1; 379/9; 379/15; 379/32; 370/244
(58) Field of Search .............................. 379/1, 9, 10, 15, 379/29, 32, 34; 370/244, 252

(56) References Cited

U.S. PATENT DOCUMENTS

| | | | | |
|---|---|---|---|---|
| 4,197,427 | * | 4/1980 | Hutcheson et al. | 379/133 |
| 4,625,081 | * | 11/1986 | Lotito et al. | 379/88.26 |
| 4,881,230 | * | 11/1989 | Clark et al. | 371/20.1 |
| 5,572,570 | * | 11/1996 | Kuenzig | 379/1 |
| 5,633,909 | * | 5/1997 | Fitch | 379/15 |
| 5,778,049 | * | 7/1998 | Young et al. | 379/10 |
| 5,802,146 | * | 9/1998 | Dulman | 379/34 |
| 5,809,108 | * | 9/1998 | Thompson et al. | 379/15 |
| 5,852,650 | * | 12/1998 | Hyyrynen et al. | 379/29 |
| 5,854,823 | * | 12/1998 | Badger et al. | 379/15 |
| 6,014,424 | * | 1/2000 | Thai | 379/15 |
| 6,038,288 | * | 3/2000 | Thomas et al. | 379/15 |

FOREIGN PATENT DOCUMENTS

WO 98/27711 * 6/1998 (WO) .............................. H04M/3/32

* cited by examiner

*Primary Examiner*—Curtis Kuntz
*Assistant Examiner*—Binh K. Tieu

(57) ABSTRACT

An automated telecommunication testing system and method in which a test computer automatically performs a test suite that is robust due to the individual robustness of the individual procedures of which the suite of tests is selectively composed that are stored in a library procedure repository and selectively used pursuant to the running of a test suite program to test a complex telecommunication system and test resources through system test interfaces. The high cost of robustness of each of the individual procedures is amortized over the repeated use of the same procedures in different suites for different applications and different types of test suites.

18 Claims, 3 Drawing Sheets

RELIABLE, UNATTENDED, AUTOMATED TESTING SYSTEM AND METHOD FOR COMPLEX TELECOMMUNICATION SYSTEMS

BACKGROUND OF THE INVENTION

This invention generally relates to a method and apparatus for testing of complex telecommunication systems and, more particularly, for automated testing of complex telecommunication systems.

In the manufacture, design and operation of complex telecommunication systems equipment, such as a central office telephone switch having connections to as many as 100,000 customer telephone lines plus thousands of trunk connections to other switches (e.g., the 5ESS® Switch as described at http://www.lucent.com/netsys/5ESS/5esswtch.html, the disclosure of which is hereby incorporated by reference), it is necessary to test the system to determine whether it is operating correctly under various operating test conditions. A complex test environment is required to test such a system, including test equipment to stress the capacity limits and verify that calls and maintenance activities work correctly even under high system load.

The present techniques for testing complex telecommunication systems employ testing software that is designed to emulate the tests that previously had been performed manually by testing personnel. These so-called automated tests are performed under control of an operator of a test computer. The operator must remain in attendance to respond to problems encountered in performing any of the automated tests and to take steps to cause the telecommunication system to recover from any failures of the system caused by the tests being performed. For example, if the automated test requires a particular system resource, such as a 2-way trunk that uses CCITT7 signaling, that is not operational or otherwise not available for use during the test, the test operator must then look for and select an alternative resource to perform the test. Likewise, if the system fails, the test operator must return the system to a predetermined state in order for the testing to continue.

The need for the attendance of test operators, especially during third work shifts and on weekends, substantially adds to the costs of testing. The present inventors have determined that this need for attendance has been caused, at least in part, by the known automated testing systems attempting to replicate the previously used manual tests. They have thereby limited the automated tests to a model of only what a manual tester could do and how a manual test would be performed.

Accordingly, these known systems have disadvantageously not been provided with the features the inventors believe is required to enable the production and operation of fully automated test systems, or unattended, automated test systems that do not require a test operator in attendance to overcome the conventional testing problems noted above.

SUMMARY OF THE INVENTION

In accordance with the present invention, a reliable, unattended, automated testing system and method of testing for a complex telecommunication system is provided that overcome the limitations and disadvantages of the known automated test systems noted above.

In accordance with the invention, the preferred embodiment of the reliable, unattended, automated testing system for a complex telecommunication system has a library procedure repository for storing a software library of commonly performed computer-executable procedures for testing a complex telecommunication system in which each of said procedures has at least one of fault tolerance strategy and failure recovery strategy as part of the procedure, and a test computer for running a suite of tests on a complex telecommunication system including at least selected ones of the commonly performed procedures of the library procedure repository.

Preferably, all the tests from which the test suites are composed have both fault tolerance strategy and failure recovery strategy integrated into the test. The fault tolerant strategy includes a strategy of automatic acquisition of alternate test resources needed to perform the test in the event of failure of primary test resources, while the failure recovery strategy integrated into the test includes at least one of the strategies of collecting more information about failures to facilitating isolating and identifying the problem, and returning the telecommunication system to a preselected state required to continue with the remainder of the tests of the suite.

Preferably, the library procedure repository includes resource object procedures for controlling common resources of a telecommunication system as objects, and the suite of tests includes at least selected ones of the resource object procedures to control the resources needed for performance of the at least selected ones of the commonly performed procedures of the library procedure repository.

Accordingly, the preferred method for reliable, unattended, automated testing of a complex telecommunication system of the present invention is performed by the steps of storing in a library procedure repository a software library of commonly performed computer-executable procedures for testing the complex telecommunication system in which each of said procedures have at least one of fault tolerance strategy and failure recovery strategy as part of the procedure, and operating a test computer to run a suite of tests on the complex telecommunication system including at least selected ones of the commonly performed procedures of the library procedure repository.

Preferably, performance of each of the tests of the suite of tests run by the computer includes the steps of selecting test resources needed for each test, establishing initial states for the test case, establishing a test scenario, determining the final states of the telecommunication system under test after completion of the test, cleaning up the test and reporting the results of the test.

BRIEF DESCRIPTION OF THE DRAWINGS

The foregoing advantageous features of the present invention (the reliable, unattended, automated testing system and method for complex telecommunication systems) will be described in detail and other advantageous features will be made apparent from the detailed description of the preferred embodiment of the invention that is given with reference to the several figures of the drawing, in which.

DETAILED DESCRIPTION

Figure 1:
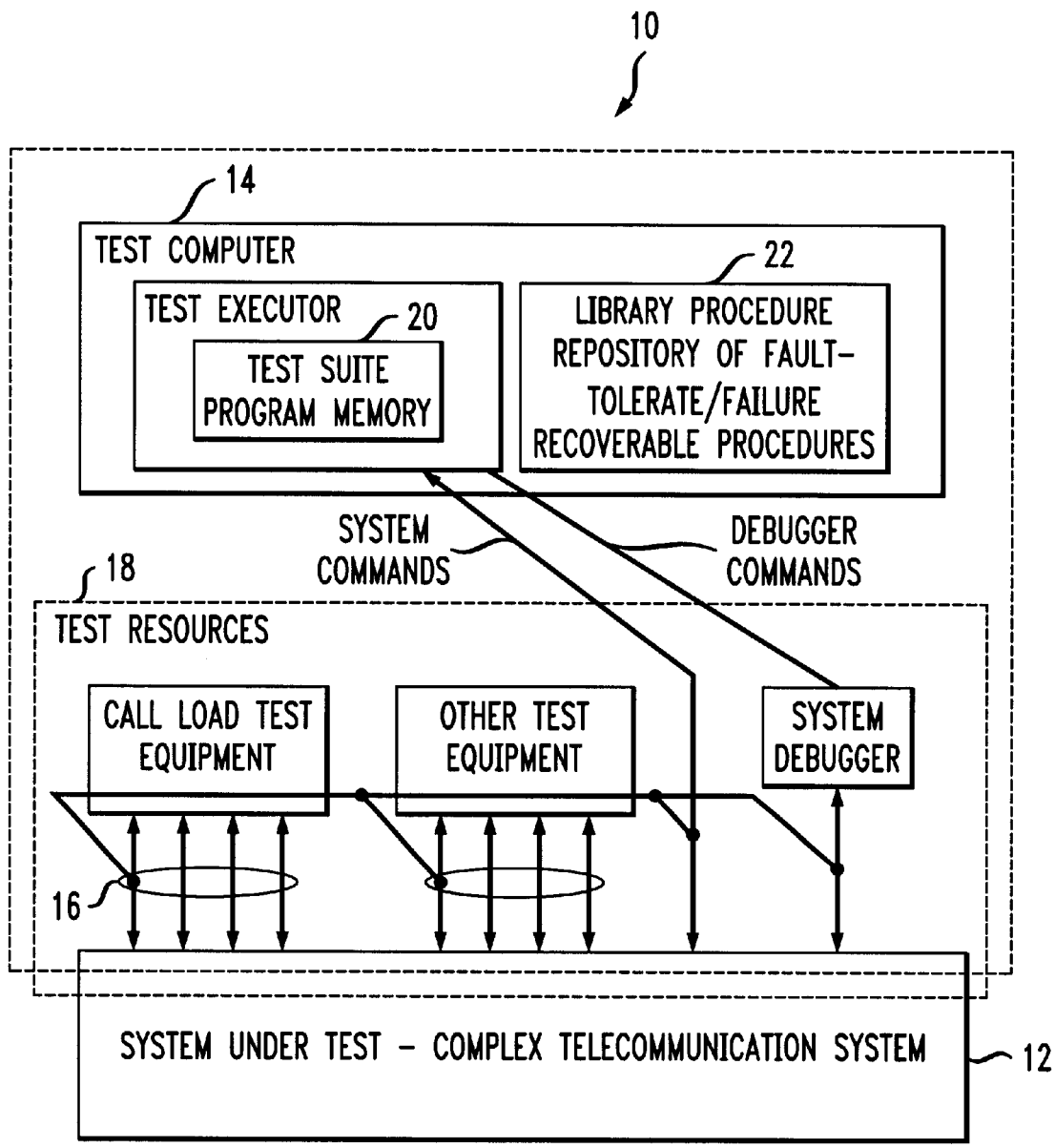
FIG. 1 is a functional block diagram of the preferred embodiment of the reliable, unattended, automated test system of the present invention connected with a complex telecommunication system under test.

Referring to FIG. 1, the preferred embodiment of the reliable, unattended, automated telecommunication testing system 10 of the present invention is shown coupled with a complex telecommunication system 12, such as a 5ESS® Switch. The testing system 10 includes a test computer 14, preferably, a computer with a multitasking operating system such as UNIX® and sufficient processor and memory capacity to handle six or more parallel testing processes. The test computer 14 is connected through system test interfaces 16 to the complex telecommunication system 12 and to external test resources 18. The external test resources 18 include:

- network elements (e.g., telephone switches, wireless base stations, cell sites;
- network connections (e.g., phone lines, trunks, signaling links);
- human interfaces to the system under test (e.g., terminals);
- test equipment to drive other interfaces to the system under test (e.g., call load boxes).

The details of the test resources 18, the system test interfaces 16 and the test computer 14, themselves, form no part of the present invention and are therefore not provided here.

In accordance with the invention, the test computer 14 executes a suite of tests in accordance with a test suite program stored in a test suite program memory 20 that controls performance of groups, or suites, of fault tolerant and failure recoverable procedures stored in a library procedure repository 22. While the details of the procedures themselves are not important to this invention what is important that each of the procedures upon which the test suite program selectively calls during the running of the test suite program is designed to be fault tolerant and failure recoverable.

This is achieved by using some of the same techniques that critical systems, such as fly-by-wire airplane control systems, employ in their software to produce highly reliable and fault tolerant code. The return codes of all commands and functions are checked, in order to explicitly detect and handle failure cases. This has typically not been done with earlier automated tests because (a) an attendant was assumed to be available to recognize and take action on such failures; (b) it requires effort to determine the range of possible failures, the actions to be taken on failure and additional coding (which may be extensive) to implement actions for failure cases that may seldom or never occur.

In addition, integrated into each test are contingency backup test plans that are automatically activated in the event a situation is encountered during the performance of the test that would interfere or prevent continuance of the test or of the test suite. Each of the procedures is capable of coping with failures of the type with which a manual tester or attendant of a prior automated test are capable of coping. For instance, if the test fails to acquire certain resources needed for the test on an initial attempt to do so, then it will try to access alternatives until suitable resources are found.

Also, each test preferably has integrated within it failure recovery capability which will cause the test to automatically recover the system, or return the system to a known state required for the continuance of testing in the event the test causes a failure for the complex communication system 12 under test. Such failure can be expected to occur, for the tests are designed to create situations for causing such failures in the event there are faults in the system in order to discover the faults. In known testing systems, in the event of occurrence of such a test induced failure of the system under test, the test stops automatically, and does not continue until the testing operator in attendance takes the necessary steps to return the system to a state from which the tests are capable of resuming. For instance, if a test performs a diagnostic on a system resource and that diagnostic fails, it will attempt to correct the failure and then restore that system resource and all related equipment to a known in-service state. If the failure cannot be corrected, the test will mark the resource as unavailable for further testing, thereby avoiding failures in subsequent tests due to the defective resource.

The details of how each test is provided with built-in fault tolerance and failure recovery, of course, varies with each different type of test being performed. The techniques in and of themselves for achieving such fault tolerance and failure recoverability and high reliability are known and reference should be made to *Software Fault Tolerance* (Trends in Software, No 3) by Michael R. Lyu (Editor), and *Safer C: Developing Software for High-Integrity and Safety-Critical Systems* (*The McGraw-Hill International Series in Software Engineering* by Les Hatton, the disclosures of which are hereby incorporated by reference. These techniques for achieving so-called "robustness" have only been used in critical operating systems in which the high cost of preventing catastrophic failure of the operating system is justified by the high risks including the risks of lives that hang in the balance. It is not believed that these high cost robustness techniques have ever been applied to the testing of complex telecommunication systems or the like.

Advantageously, in accordance with the present invention, the high cost of applying these robustness techniques to the automated testing of telecommunication systems is overcome. This is achieved by providing each individual test with its own robustness built-in to the test to enable different assemblages of the robust procedures into different test suites for different applications. The individual robust test are stored in the library procedure repository of fault tolerant/failure recoverable procedures 22 and are selectively made available to different test suite programs 20 for testing different systems 12 or different aspects of the same system 12. Because each of the procedures of each suite of tests is, itself, robust, i.e. has checked return codes, fault tolerance and failure recoverability each of the resulting suites of tests is also robust. Accordingly, in accordance with one aspect of the invention the high cost of providing robustness to each of the individual procedures is amortized over numerous uses of the same robust procedures in different suites of tests. Through use of the invention, it is thereby possible to provide a plurality of highly robust suites of telecommunication tests that are capable of operating without attendance of an operator at relatively low cost. These robust procedures are thus commonly used procedures that are used repeatedly in different applications with different suites.

Figure 2:
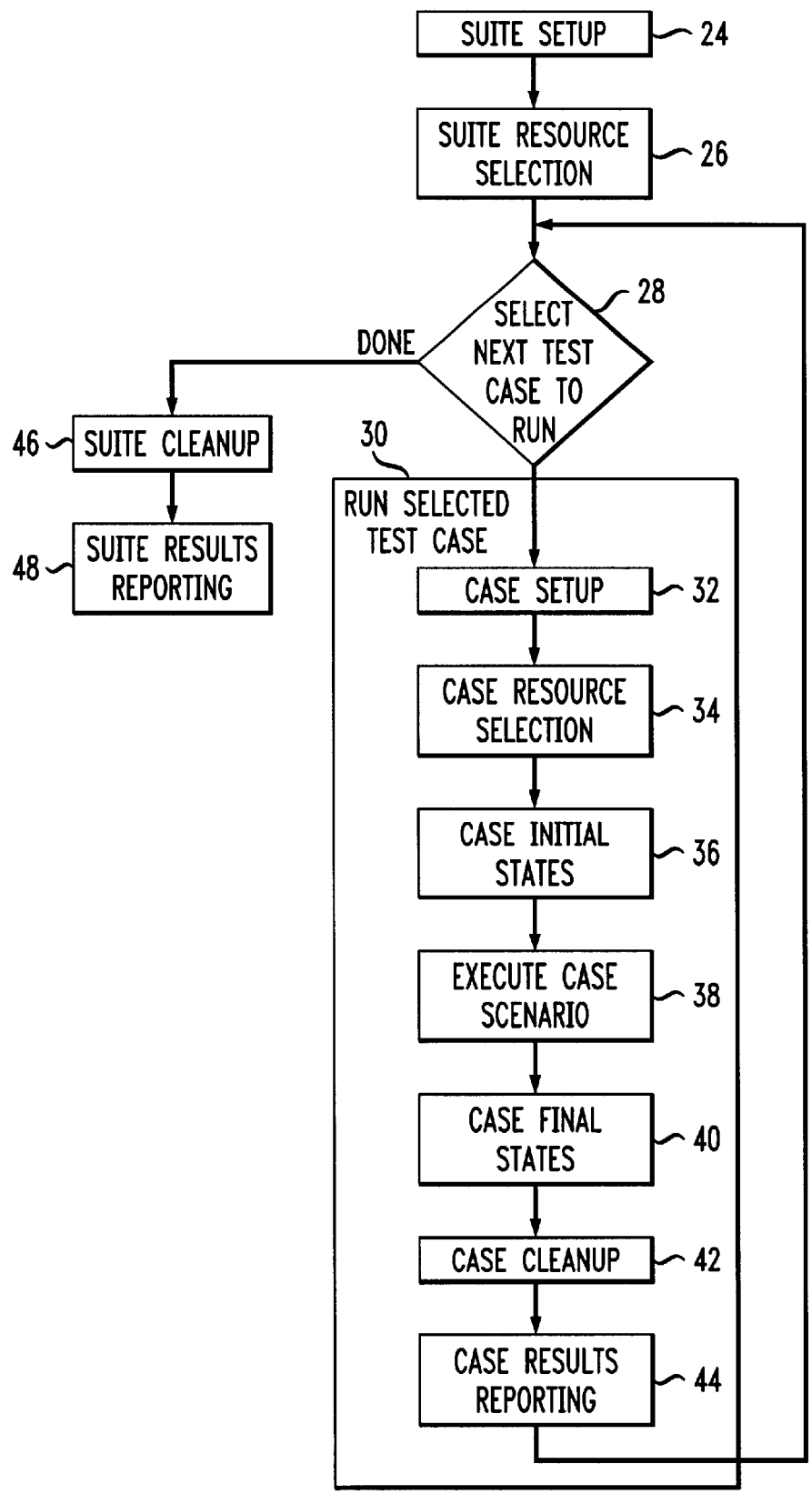
FIG. 2 is a logic flow chart of the preferred embodiment of the computer program employed at the test computer of FIG. 1 to implement the testing method of the present invention.

Referring to FIG. 2, the test suites that employ selected ones of the different robust procedures each function in accordance with the logic flow chart of FIG. 2. In the first step 24, the suite is set up by performing one or more of the following steps:

- Parse command line parameters and set suite variables to control execution;
- Determine set of test cases to be executed;
- Assess the original state of the system under test;
- Read/set data internal to the system under test which is needed for the entire test suite execution, e.g., creating private data files;

Start background activities (e.g., call load).

Next, in step 26 the resources needed by the suite of tests to be performed are selected. For example, a test suite might need a pair of phone lines and a piece of test equipment to simulate users taking the phones off hook, dialing, etc. Depending on the resources needed for the test suite, one or more resource object procedures from the procedure library repository will be used to acquire the needed resources by making a random selection from the set of suitable resources available, and to ensure their usability for the purpose of the test suite. After the resource selection, in step 28 the next test, or test case, or case, of the suite of test cases that is to be run according to the test suite program that has been set up in step 24 is identified.

In step 30, the selected test case is run. Running each of the robust test includes performance of several substeps, or steps. In step 32, the test case is set up by performing one or more of the following steps:

Reading/setting data internal to the system under test that is needed for this particular test case;

Modify behavior based on suite setup.

Next, in step 34, the case resource selection is made. Depending on the resources needed for the test case, one or more resource object procedures from the procedure library repository will be used to acquire the needed resources by making a random selection from the set of suitable resources available, and to ensure their usability for the purpose of the test case. In step 36, the initial states of the system 12 under test are established by such actions on resources as making phone calls, performing recent changes, and setting hardware maintenance states. In step 38, the case scenario (the actual test stimulus/stimuli and checking for response(s) to determine success or failure) is performed, and in step 40, the final states of the system 12 are determined. Case cleanup is performed in step 42 using one or more of the following steps:

return system under test to predetermined state (undo any actions specific to this case, possibly do a general restore in the event of a failure);

check for unexpected system under test behavior during the interval when the case was executed;

release any resources specific to this case.

Finally, in step 44, the test case results are reported to the test computer 14, and the program returns to step 28, at which the next test case of the suite is selected for performance of the above steps 32–44.

The program passes sequentially through the suite of tests until all of the test cases have been completed. When the last test is done, then the program moves from step 28 to step 46 for suite clean up, performing one or more of the following steps:

Return system under test to original state (not only undo changes as the result of individual test cases, but changes made as part of suite setup);

Check for unexpected system under test behavior;

Release resources allocated during test suite execution;

Determine/report final results.

In the next step 48, the results of the entire suite of test is reported to the test computer for storage and display.

Figure 3:
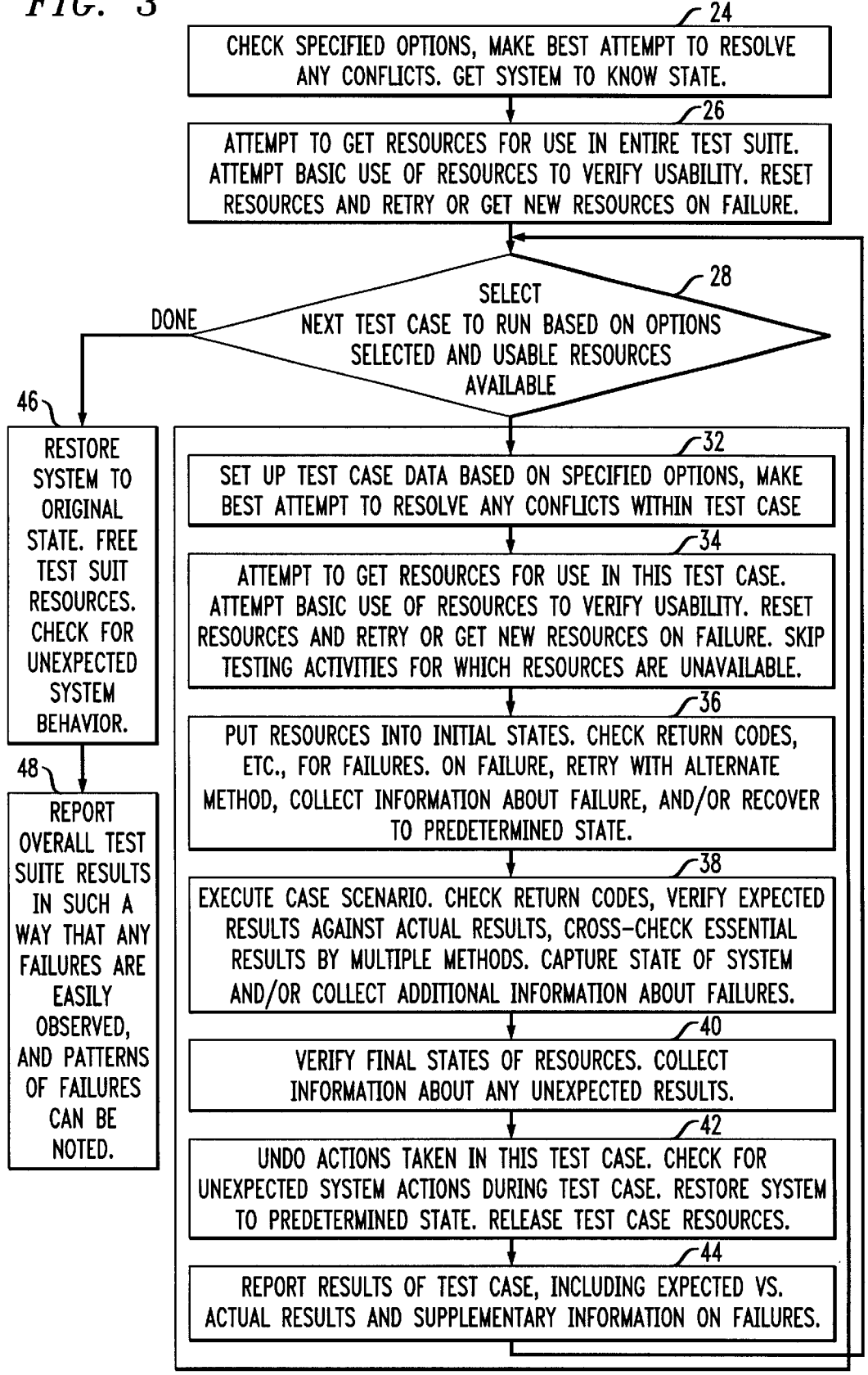
FIG. 3 is a generic logic flow chart of the robust procedures stored in the library procedure repository of FIG. 1.

Referring now to FIG. 3, for a description of the robustness in accordance with the invention, each step in the test suites that employ selected ones of the different robust procedures each incorporate robustness, reliability, and fault tolerance as shown. Steps are numbered as in FIG. 2. Note that the robustness, reliability, and fault tolerance strategies apply to failures caused by any components of FIG. 1, not just the system under test. The strategies employed include the following:

1. If the user-specified inputs to control the function of the test suite are inconsistent, attempt to do something reasonable.
2. Get system under test to known state prior to attempting any test operations.
3. Attempt basic use of randomly selected resources that satisfy testing requirements in a basic scenario to verify usability prior to testing.
4. Detect failures (by checking return codes, verifying expected results, cross-checking essential results by multiple methods).
   Distinguish between results that are significant and results that are incidental (e.g., formatting of output);
   Retrieve all associated responses rather than just expected response (enables fault recovery).
5. Reset resources (if possible) and retry on failure.
6. Get new resources and retry on failure.
7. Retry on failure using alternate method.
8. Skip nonessential testing for which no working resources are available (do as much testing as possible with available, usable resources).
9. Capture the state of the system under test at the time of a failure to aid in determining the cause of the failure.
10. Collect information about a failure to aid in determining the cause of the failure.
11. Perform further testing based on the state of the system under test after the failure occurred.
12. Recover system under test to a predetermined state to continue testing after a failure.

While a preferred embodiment of the invention has been disclosed in detail, it should be appreciated that variations may be made from the preferred embodiment without departing from the scope of the invention as defined in the appended claims.

What is claimed is:

1. A reliable, unattended, automated testing system for complex telecommunication systems, the system comprising:

a library procedure repository for storing a software library of commonly performed computer-executable procedures for unattended, automatic testing of a complex telecommunication system, each of said procedures having at least one of a fault tolerance strategy and a failure recovery strategy as part of the procedure; and a test computer that is external and independent relative to the complex telecommunication system and comprises a single point of control for running a suite of tests on the complex telecommunication system including at least selected ones of the commonly performed computer-executable procedures for unattended, automatic testing of the complex telecommunication system.

2. The reliable, unattended, automated testing system of claim 1, wherein at least some of the at least selected ones of the procedures have both the fault tolerance strategy and the failure recovery strategy integrated therein.

3. The reliable, unattended, automated testing system of claim 1, wherein all of the at least selected ones of the procedures have both the fault tolerance strategy and the failure recovery strategy integrated therein.

4. The reliable, unattended, automated testing system of claim 1, wherein the library procedure repository comprises: resource object procedures for controlling common resources of the telecommunication system as objects; and wherein the suite of tests comprises at least selected ones of the resource object procedures to control one or more resources that allow performance of the at least selected ones of the commonly performed procedures for unattended, automatic testing of the complex telecommunication system.

5. The reliable, unattended, automated testing system of claim 1, wherein one or more of the at least selected ones of the procedures comprise the fault tolerance strategy, and wherein the fault tolerance strategy comprises a strategy of automatic acquisition of one or more alternative test resources that allow performance of a test upon failure of one or more primary test resources.

6. The reliable, unattended, automated testing system of claim 1, wherein one or more of the at least selected ones of the procedures comprise the failure recovery strategy, and wherein the failure recovery strategy comprises a strategy of returning the complex telecommunication system to a predetermined state.

7. A reliable, unattended, automated testing method for complex telecommunication systems, the method comprising the steps of:
storing in a library procedure repository a software library of commonly performed computer-executable procedures for unattended, automatic testing of a complex telecommunication system, each of said procedures having at least one of a fault tolerance strategy and a failure recovery strategy as part of the procedure; and
operating a test computer that is external and independent relative to the complex telecommunication system and comprises a single point of control for running a suite of tests on the complex telecommunication system including at least selected ones of the commonly performed computer-executable procedures for unattended, automatic testing of the complex telecommunication system.

8. The reliable, unattended, automated testing method of claim 7, wherein at least some of the at least selected one of the procedures have both the fault tolerance strategy and the failure recovery strategy integrated therein.

9. The reliable, unattended, automated testing method of claim 7, wherein all of the at least selected ones of the procedures have both the fault tolerance strategy and the failure recovery strategy integrated therein.

10. The reliable, unattended, automated testing method of claim 7, wherein the library procedure repository comprises resource object procedures for controlling common resources of the telecommunication system as objects; and
wherein the suite of tests comprises at least selected ones of the resource object procedures to control one or more resources that allow performance of the at least selected ones of the commonly performed procedures for unattended, automatic testing of the complex telecommunication system.

11. The reliable, unattended, automated testing method of claim 7, wherein one or more of the at least selected ones of the procedures comprise the fault tolerance strategy, and wherein the fault tolerance strategy comprises a strategy of automatic acquisition of one or more alternative test resources that allow performance of a test upon failure of one or more primary test resources.

12. The reliable, unattended, automated testing method of claim 7, wherein one or more of the at least selected ones of the procedures comprise the failure recovery strategy, and wherein the failure recovery strategy comprises a strategy of returning the complex telecommunication system to a predetermined state.

13. The reliable, unattended, automated testing method of claim 7, wherein the suite of tests comprises a first suite of tests, and further comprising the step of:
operating the test computer to run a second suite of tests including some of the at least selected ones of the commonly performed computer-executable procedures for unattended, automatic testing of the complex telecommunication system of the first suite of tests.

14. The reliable, unattended, automated testing method of claim 13, wherein the complex telecommunication system comprises a first complex telecommunication system;
wherein the step of operating the test computer to run the second suite of tests comprises the step of performing the second suite of tests on a second complex telecommunication system; and
wherein the test computer is external and independent relative to the second complex telecommunication system and comprises a single point of control for running the second suite of tests on the second complex telecommunication system.

15. The reliable, unattended, automated testing method of claim 7, wherein the step of operating the test computer comprises the steps of:
selecting one or more test resources that allow performance of a test in the suite of tests;
establishing one or more initial states for the test;
establishing a test scenario for the test;
determining a final state of the complex telecommunication system under test upon completion of the test;
cleaning up upon completion of the test; and
reporting one or more results of the test.

16. The reliable, unattended, automated testing system of claim 1, wherein the suite of tests comprises a first suite of tests; and
wherein the test computer runs a second suite of tests including some of the at least selected ones of the commonly performed computer-executable procedures for unattended, automatic testing of the complex telecommunication system of the first suite of tests.

17. The reliable, unattended, automated testing system of claim 16, wherein the complex telecommunication system comprises a first complex telecommunication system;
wherein the test computer performs the second suite of tests on a second complex telecommunication system; and
wherein the test computer is external and independent relative to the second complex telecommunication system and comprises a single point of control for running the second suite of tests on the second complex telecommunication system.

18. The reliable, unattended, automated testing system of claim 1, wherein the test computer:
selects one or more test resources that allow performance of a test in the suite of tests;
establishes one or more initial states for the test;
establishes a test scenario for the test;
determines a final state of the complex telecommunication system under test upon completion of the test;
cleans up upon completion of the test; and
reports one or more results of the test.

* * * * *